No. 11,987. Reissued May 13, 1902.

J. LINDSEY.

LOGGING TRUCK.

WITNESSES:

F. B. Townsend

N. W. Munday

INVENTOR.

J. Lindsey.

BY

Munday, Evarts & Adcock.

ATTORNEYS

UNITED STATES PATENT OFFICE.

JOHN LINDSEY, OF LAUREL, MISSISSIPPI, ASSIGNOR TO THE LINDSEY WAGON COMPANY, OF LAUREL, MISSISSIPPI.

LOGGING-TRUCK.

SPECIFICATION forming part of Reissued Letters Patent No. 11,987, dated May 13, 1902.

Original No. 658,215, dated September 18, 1900. Application for reissue filed January 10, 1902. Serial No. 89,232.

*To all whom it may concern:*

Be it known that I, JOHN LINDSEY, of Laurel, in the county of Jones and State of Mississippi, have invented a new and Improved Logging-Truck, of which the following is a full, clear, and exact description.

One object of my invention is to provide a low two-wheeled logging cart or truck having a concave bolster, so that a log may be rolled to a central position on the bolster and remain in position without the use of standards.

Another object of the invention is to provide the truck with tongs adapted for engagement with a log, an adjustable support for the tongs, with which they are adjustably connected, and a locking device for said support.

A further object of the invention is to so construct the cart or truck that the log may be drawn over the wheels upon the bolster.

The invention consists in a novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
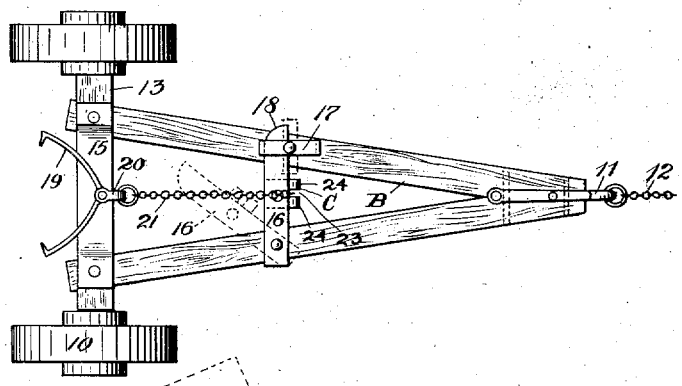
Figure 2:
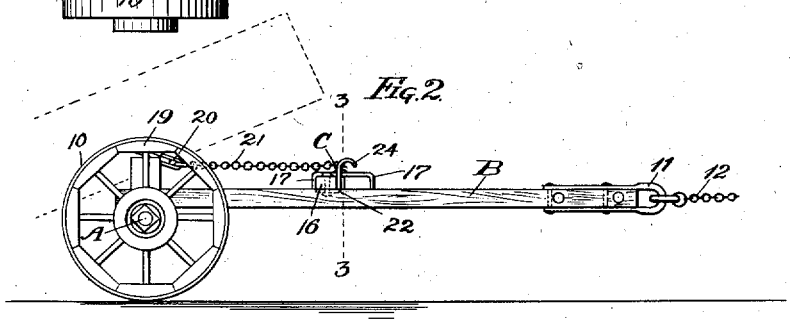
Figure 3:
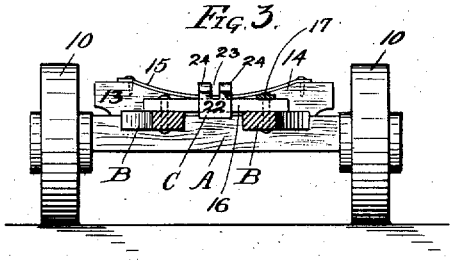

Figure 1 is a plan view of the improved truck. Fig. 2 is a side elevation of the same, and Fig. 3 is a vertical transverse section taken substantially on the line 3 3 of Fig. 2.

The truck is provided with a single axle A, provided with spindles at its ends, and very low wheels 10 are mounted to turn freely on the spindles. A pole or tongue B extends forwardly from the axle A, and this pole or tongue comprises two bars or beams that are brought together and secured at their forward ends, while they diverge at their rear ends and are secured at said rear ends to the axle in any desired manner. The tongue or pole is provided with a clevis 11 of any desired construction, to which the draft-chain 12 is attached. A bolster 13 is secured upon the axle, and said bolster is provided with a concaved upper face 14, which face is protected by a wear-plate 15, as shown in Fig. 3. A cross-bar 16 is pivoted at one end to a member of the pole or tongue B, and the opposite end of the cross-bar 16 may be locked to the opposing member of the pole or tongue through the medium of a button 17, carried thereby. This button preferably consists of a straight body having downwardly-projecting ends, and the pivot-pin of the button is passed centrally through the body of the same. In order that the button 17 may readily engage with the cross-bar 16, the free end of the said cross-bar is provided with a rounded surface 18, as illustrated in Fig. 1. When the cross-bar is locked by the button 17, it is parallel with the axle.

A pair of tongs 19 accompanies the truck, being adapted to normally rest upon the bolster 13, and these tongs are adapted to grip the log that is to be carried by the truck. A bail 20 is connected with the tongs 19 at their pivotal portion, and a length of chain 21 is attached to the bail 20. The forward end of the chain 21 is adapted for engagement with a keeper C, carried by the cross-bar 16. The keeper C is at the front central portion of the cross-bar 16 and extends above the upper face of the said bar, as illustrated in Figs. 2 and 3. This plate 22 is provided with a vertical central slot 23, and the upper ends of the members formed by the slot 23 are bent forwardly and downwardly, forming hooks 24. Any link of the chain 21 may be passed edgewise through the slot 23 of the keeper. The next forward or lower link will thereupon present its side face to the front and will engage at the top with the hooks 24 of the keeper, thus holding the forward end of the chain stationary and the tongs in the position to which they have been adjusted.

The operation is as follows: The cart or truck is backed against a log near the central portion of said log and the tongue B of the cart or truck is raised to a vertical position. The tongs are then attached to the log, one member of the tongs being at the top of said log and the other member at the bottom of the same. The team is then driven off at a right angle to the position of the log, whereupon the lightest end of the log will be raised over the truck, and as the team continues to move away the log will swing around on the bolster and will assume a position transversely of the bolster and will naturally seek the lowest point in the curved upper face of said bolster. It will be understood that prior to attaching the tongs to the log the chain 21 will have been attached to the keeper C and the cross-bar 16 will have been locked to the tongue. When the log is to be unloaded, the latch or button 17 is turned in a manner to release the free end of the cross-bar 16, the position of the latch or button being at that time transversely of the tongue, as shown in the dotted lines in Fig. 1. The cross-bar will then be moved rearward, as is likewise shown in Fig. 1, slackening the chain 21 and permitting it to be detached from the keeper C and the tongs to be disengaged from the log. The team is then driven ahead, and the log will slip off the bolster at the rear of the truck.

Having thus described my invention, I claim as new and desire to secure by Letters Patent—

1. In a logging truck or cart, the combination, with an axle, wheels thereon and a pole or tongue extending forwardly from said axle, of a bolster secured to the axle, provided with a concaved upper face, a pivoted cross-bar carried by the pole or tongue, a latch for the said cross-bar, and tongs connected with the said cross-bar, for the purpose specified.

2. In a logging truck or cart, the combination, with an axle, wheels loosely mounted on the axle, and a pole or tongue forwardly projected from the axle, of a bolster secured on the said axle, a cross-bar pivoted at one end on the pole or tongue, a latch for the opposite end of the cross-bar, a keeper carried by the said cross-bar, tongs, and a pliable and adjustable connection between the said keeper and said tongs, for the purpose specified.

3. A logging-truck, having a tongue, in combination with a cross-bar pivoted by one end to the tongue, means for locking said cross-bar in position transverse of the tongue, a chain-securing device on said cross-bar, a chain, and tongs adapted to engage a log, substantially as described.

4. A logging-truck, having a tongue, in combination with a cross-bar pivoted by one end to the tongue, means for locking said cross-bar in a position transverse of the tongue, a slotted plate extending upwardly from said cross-bar and having its upper ends curved forwardly, the slot in said plate being adapted to snugly embrace a chain-link placed flatwise therein, a chain adapted to fit in said slot, and tongs secured to said chain and adapted to lie on the truck-bolster when in use, substantially as described.

5. A logging-truck having an A-shaped tongue, and draft-attaching means at the forward end thereof, in combination with a cross-bar pivoted by one end to one side of the tongue, releasable locking means for the other end of the cross-bar and adapted to hold the cross-bar transversely of the tongue, chain-securing means upon the cross-bar, a chain, and tongs secured thereto and adapted to secure a log, substantially as described.

6. The combination with a logging-truck having a wheeled axle and a horizontally-widened pole or tongue attached thereto, of a horizontally-swinging bar mounted at one end on the pole or tongue near one side thereof, a log-gripping device adapted to engage the log, a connection between the gripping device and the bar, and a latch engaging the free end of the bar to hold the same and situate near the side of the pole or tongue opposite the pivot of the bar.

7. The logging-truck wherein are combined an axle, low wheels thereon, a tongue extending forward from said axle, a bolster on the axle having its top extending approximately to the height of the wheels, and a grappling device secured to the tongue forward of the axle and carried over the top of the bolster and supported thereon, substantially as specified.

JOHN LINDSEY.

Witnesses:
L. H. WEEMS,
E. N. PATTON.